(12) United States Patent
Chang

(10) Patent No.: US 10,310,216 B2
(45) Date of Patent: Jun. 4, 2019

(54) OPTICAL LENS

(71) Applicant: HON HAI PRECISION INDUSTRY CO., LTD., New Taipei (TW)

(72) Inventor: Tsung-Heng Chang, Tu-Cheng (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/693,356

(22) Filed: Aug. 31, 2017

(65) Prior Publication Data

US 2019/0064479 A1 Feb. 28, 2019

Related U.S. Application Data

(60) Provisional application No. 62/549,444, filed on Aug. 24, 2017.

(51) Int. Cl.
*G02B 9/62* (2006.01)
*G02B 27/00* (2006.01)

(52) U.S. Cl.
CPC ........... *G02B 9/62* (2013.01); *G02B 27/0025* (2013.01)

(58) Field of Classification Search
CPC .... G02B 13/0045; G02B 13/002; G02B 9/62; G02B 27/0025; G02B 13/18; G02B 13/16; G02B 13/04; G02B 7/028
See application file for complete search history.

(56) References Cited

U.S. PATENT DOCUMENTS 8,854,744 B2 * 10/2014 Liao .................... G02B 13/0045
359/713
2013/0329306 A1 * 12/2013 Tsai .................... G02B 13/0045
359/713

* cited by examiner

*Primary Examiner* — Alicia M Harrington
(74) *Attorney, Agent, or Firm* — ScienBiziP, P.C.

(57) ABSTRACT

An optical lens has an optical axis and comprises a first lens having a positive refractive power, a second lens having a positive refractive power or a negative refractive power, a third lens having a positive refractive power, a fourth lens having a negative refractive power, a fifth lens having a positive refractive power, a sixth lens having a negative refractive power, and an image plane. The first lens, the second lens, the third lens, the fourth lens, the fifth lens, the sixth lens, and the image plane are arranged in that sequence from object-side to image-side along the optical axis.

10 Claims, 10 Drawing Sheets

OPTICAL LENS

CROSS-REFERENCE TO RELATED APPLICATIONS

This application claims the benefit under 35 U.S.C. § 119(c) of U.S. Provisional Application No. 62/549444, filed on Aug. 24, 2017, entitled "OPTICAL LENS", the disclosure of which is incorporated by reference herein.

FIELD

The subject matter herein generally relates to a lens, and more particularly, to an optical lens.

BACKGROUND

In a field of photography, a camera lens is used to capture images. In order to get a more compact optical system, the size of optical lens should be smaller, which makes it difficult to achieve a low distortion.

BRIEF DESCRIPTION OF THE DRAWINGS

Implementations of the present technology will now be described, by way of example only, with reference to the attached figures.

DETAILED DESCRIPTION

Figure 1:
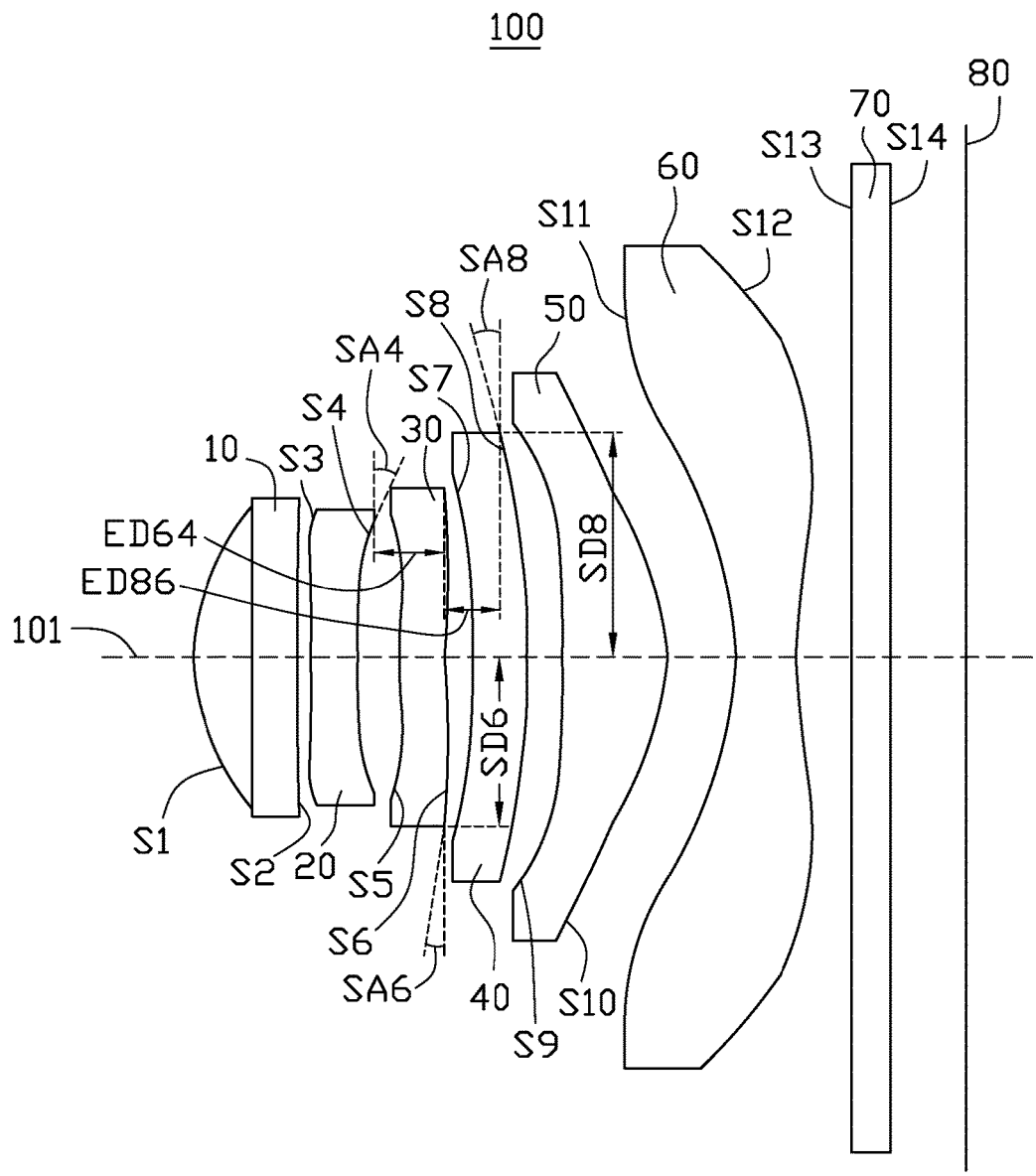
FIG. 1 is a diagram of a first exemplary embodiment of an optical lens.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better. The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising" when utilized, means "including, but not necessarily limited to"; it specifically indicates open-ended inclusion or membership in the so-described combination, group, series, and the like.

FIG. 1 illustrates an exemplary embodiment of an optical lens 100. The optical lens 100 can be applied in a safety system or an electronic device (such as mobile phone, personal computer, game machine, and camera).

The optical lens 100 comprises a first lens 10, a second lens 20, a third lens 30, a fourth lens 40, a fifth lens 50, a sixth lens 60, an optical filter 70, and an image plane 80, arranged in that sequence from object-side to image-side, along an optical axis 101 of the optical lens 100. The first lens 10, the second lens 20, the third lens 30, the fourth lens 40, the fifth lens 50, the sixth lens 60, the optical filter 70, and the image plane 80 each is symmetric around the optical axis 101.

The first lens 10 has a positive refractive power. The first lens 10 comprises a first surface S1 and a second surface S2 facing away from the first surface S1. The first surface S1 and the second surface 2 are arranged in that sequence from object-side to image-side. The first surface S1 and the second surface S2 each is symmetric around the optical axis 101. In at least one exemplary, the first surface S1 is a convex surface facing the object-side.

The second lens 20 has a positive refractive power or a negative refractive power. The second lens 20 comprises a third surface S3 and a fourth surface S4 facing away from the third surface S3. The third surface S3 and the fourth surface S4 are arranged in that sequence from object-side to image-side. The third surface S3 and the fourth surface S4 each is symmetric around the optical axis 101. In at least one exemplary, the fourth surface S4 is a concave surface facing the image-side.

The third lens 30 has a positive refractive power. The third lens 30 comprises a fifth surface S5 and a sixth surface S6 facing away from the fifth surface S5. The fifth surface S5 and the sixth surface S6 are arranged in that sequence from object-side to image-side. The fifth surface S5 and the sixth surface S6 each is symmetric around the optical axis 101. In at least one exemplary, the fifth surface S5 is a concave surface facing the object-side, the sixth surface S6 is a convex surface facing the image-side.

The fourth lens 40 has a negative refractive power. The fourth lens 40 comprises a seventh surface S7 and an eighth surface S8 facing away from the seventh surface S7. The seventh surface S7 and the eighth surface S8 are arranged in that sequence from object-side to image-side. The seventh surface S7 and the eighth surface S8 each is symmetric around the optical axis 101. In at least one exemplary, the seventh surface S7 is a concave surface facing the object-side, the eighth surface S8 is a convex surface facing the image-side.

The fifth lens 50 has a positive refractive power. The fifth lens 50 comprises a ninth surface S9 and a tenth surface S10 facing away from the ninth surface S9. The ninth surface S9 and the tenth surface S10 are arranged in that sequence from object-side to image-side. The ninth surface S9 and the tenth surface S10 each is symmetric around the optical axis 101. The tenth surface S10 and the first surface S1 are concaved toward opposite directions, or convexed toward opposite directions. In at least one exemplary, the ninth surface S9 is a concave surface facing the object-side, the tenth surface S10 is a convex surface facing the image-side.

The sixth lens 60 has a negative refractive power. The sixth lens 60 comprises an eleventh surface S11 and a twelfth surface S12 facing away from the eleventh surface S11. The eleventh surface S11 and the twelfth surface S12 are arranged in that sequence from object-side to image-side. The eleventh surface S11 and the twelfth surface S12 each is symmetric around the optical axis 101. In at least one exemplary, the eleventh surface S11 is a concave surface facing the object-side, the twelfth surface S12 is a convex surface facing the image-side.

The optical filter 70 comprises a thirteenth surface S13 and a fourteenth surface S14 facing away from the thirteenth surface S13. The thirteenth surface S13 and the fourteenth surface S14 are arranged in that sequence from object-side to image-side. The thirteenth surface S13 and the fourteenth surface S14 each is symmetric around the optical axis 101.

The optical lens 100 satisfies the following conditions, (1), (2) and (3):

$$21.3° < SA4 < 24.7°; \quad (1)$$

$$59° < SA6+X < 68°, \text{ and } X=\arctan(SD6/ED64); \quad (2)$$

$$81° < SA8+Y < 89°, \text{ and } Y=\arctan(SD8/ED86). \quad (3)$$

Wherein, SA4 denotes an angle between a tangent at an end portion of the fourth surface S4 and the image plane 80. SA6 denotes an angle between a tangent at an end portion of the sixth surface S6 and the image plane 80. SA8 denotes an angle between a tangent at an end portion of the eighth surface S8 and the image plane 80. SD6 denotes a distance of the sixth surface S6 from the end portion of the sixth surface S6 to the optical axis 101. ED64 denotes a distance from the end portion of the sixth surface S6 to the end portion of the fourth surface S4 along an extending direction of the optical axis 101. SD8 denotes a distance of the eighth surface S8 from the end portion of the eighth surface S8 to the optical axis 101. ED86 denotes a distance from the end portion of the eighth surface S8 to the end portion of the sixth surface S6 along the extending direction.

Since the optical lens 100 satisfies the above conditions, the optical lens 100 can reduce distortion and maintain a good imaging quality.

In at least one exemplary embodiment, the optical lens 100 further satisfies the following conditions (4):

$$0.67 < (T2*T3)/(T4*A2) < 0.96. \quad (4)$$

Wherein, T2 denotes a center thickness of the second lens 20. T3 denotes a center thickness of the third lens 30. T4 denotes a center thickness of the fourth lens 40. A2 denotes a distance from the second lens 20 to the third lens 30 along the optical axis 101.

Since the optical lens 100 satisfies the above condition (4), the optical lens 100 can improve tolerance sensitivity and be compact in size.

In at least one exemplary embodiment, the optical lens 100 further satisfies the following conditions (5):

$$-1.19 < (R1*vd1)/(R10*vd5) < -1.01. \quad (5)$$

Wherein, R1 denotes a radius of curvature of the first surface 51, and vd1 denotes an Abbe number of the first lens 10. R10 denotes a radius of curvature of the tenth surface S10, and vd5 denotes an Abbe number of the fifth lens 50.

Since the optical lens 100 satisfies the above condition (5), color aberration of the optical lens 100 can be reduced.

In at least one exemplary embodiment, the optical lens 100 further satisfies the following conditions (6):

$$-0.021 < \{[(D6+0.7)/T6]-15\}/100 < 0.043. \quad (6)$$

Wherein, D6 denotes a clear aperture diameter of the sixth lens 60. T6 denotes a center thickness of the sixth lens 60.

Since the optical lens 100 satisfies the above condition (6), the optical lens 100 can maintain an enough space for receiving optical elements (such as lenses and filter) and obtain a good manufacturability.

In at least one exemplary embodiment, the optical lens 100 further satisfies the following conditions (7):

$$0.043 < (f1*f5)/(f2*f6) < 0.92. \quad (7)$$

Wherein, f1 denotes an effective focal length of the first lens 10. f5 denotes an effective focal length of the fifth lens 50. f2 denotes an effective focal length of the second lens 20. f6 denotes an effective focal length of the sixth lens 60.

The condition (7) can contribute to balance among the optical refractive powers of the first lens 10, the second lens 20, the third lens 30, the fourth lens 40, the fifth lens 50, and the sixth lens 60, to improve the manufacturability and the tolerance sensitivity of the optical lens 100.

The aspherical surface can satisfy the following formula:

$$Z = \frac{ch^2}{1+\sqrt{1-(k+1)c^2h^2}} + A_2h^2 + A_4h^4 + A_6h^6 + A_8h^8 + A_{10}h^{10} + A_{12}h^{12} + A_{14}h^{14} + A_{16}h^{16}$$

Of the formula, Z denotes an aspherical surface sag of each surface; c denotes a reciprocal of radius of curvature; h denotes a radial distance of the surface from the optical axis; k denotes a conic constant; A2, A4, A6, A8, A10, A12, A14, and A16 denote a second aspherical coefficient, a fourth aspherical coefficient, a sixth aspherical coefficient, a eighth aspherical coefficient, a tenth aspherical coefficient, a twelfth aspherical coefficient, a fourteenth aspherical coefficient, and a sixteenth aspherical coefficient, respectively.

In the following examples, L denotes a distance between two adjacent surfaces along the optical axis 101; N denotes a refractive index of each lens; vd N denotes an Abbe number of each lens; ED denotes a distance between two end portions of two adjacent surfaces along the extending direction; EFL denotes an effective focal length; F/NO denotes an F-number; DFOV denotes a field of view angle. Referring to FIGS. 2-5 and 7-10, B denotes blue light having a wavelength of 486.1 nm, G denotes green light having a wavelength of 588.6 nm, and R denotes red light having a wavelength of 656.3 nm. T denotes a tangential field curvature curve and S denotes a sagittal field curvature curve.

EXAMPLE 1

Tables 1-2 list the parameters of the optical lens 100 of the example 1.

TABLE 1

EFL = 3.49 mm, F/NO = 2, DFOV = 79°

| element | surface | Surface. Type | c | L | N | vd | h or SD | k | ED |
|---|---|---|---|---|---|---|---|---|---|
| first lens | S1 | asphere | 1.29 | 0.55 | 1.545 | 56 | 0.89 | 0.11 | 0.23 |
|  | S2 | asphere | 12.01 | 0.07 | — | — | 0.85 | 0.00 | 0.09 |
| second lens | S3 | asphere | −9.29 | 0.25 | 1.661 | 20.4 | 0.82 | 0.00 | 0.32 |
|  | S4 | asphere | 6.31 | 0.22 | — | — | 0.76 | 60.30 | 0.09 |
| third lens | S5 | asphere | 3.72 | 0.25 | 1.661 | 20.4 | 0.79 | −1.21 | 0.28 |
|  | S6 | asphere | 4.03 | 0.15 | — | — | 0.94 | −2.53 | 0.05 |
| fourth lens | S7 | asphere | −6.92 | 0.29 | 1.545 | 56 | 1.03 | −10.10 | 0.26 |
|  | S8 | asphere | −20.78 | 0.20 | — | — | 1.25 | 0.00 | 0.06 |
| fifth lens | S9 | asphere | −14.55 | 0.56 | 1.545 | 56 | 1.32 | 0.00 | 0.24 |
|  | S10 | asphere | −1.15 | 0.37 | — | — | 1.57 | −4.43 | 0.37 |
| sixth lens | S11 | asphere | −2.04 | 0.33 | 1.545 | 56 | 2.03 | −0.19 | 0.41 |
|  | S12 | asphere | 2.05 | 0.29 | — | — | 2.28 | −25.67 | 0.80 |
| optical filter | S13 |  | infinity | 0.21 | 1.523 | 54.5 | 2.68 | — | 0.21 |
|  | S14 |  | infinity | 0.40 | — | — | 2.74 | — | 0.40 |
| image plane |  |  | infinity | — | — | — | 2.95 | — | 0.00 |

TABLE 2

|  | S1 | S2 | S3 | S4 | S5 | S6 |
|---|---|---|---|---|---|---|
| $A_2$ | 0 | 0 | 0 | 0 | 0 | 0 |
| A4 | −0.02733 | −0.046850888 | −3E−05 | −0.03684 | −0.28286 | −0.16756 |
| A6 | 0.08933 | 0.004519502 | 0.277837 | 0.315975 | −0.04662 | −0.02016 |
| A8 | −0.24202 | 0.315904472 | −0.09503 | −0.40447 | 0.056264 | −0.05179 |
| A10 | 0.118945 | −0.516813734 | 0.007217 | 0.51616 | −0.2221 | 0.201964 |
| A12 | 0.205625 | −0.017217791 | −0.35326 | −0.36599 | 0.344472 | −0.24031 |
| A14 | −0.29849 | 0.176381 | 0.40984 | 0.070757 | −0.21974 | 0.156238 |
| A16 | 0 | 0 | 0 | 0 | 0 | 0 |

|  | S7 | S8 | S9 | S10 | S11 | S12 |
|---|---|---|---|---|---|---|
| $A_2$ | 0 | 0 | 0 | 0 | 0 | 0 |
| A4 | −0.04701 | −0.09239 | −0.08085 | −0.09992 | −0.02065 | −0.06457 |
| A6 | 0.039902 | 0.024741 | 0.039824 | 0.079027 | 0.024897 | 0.019395 |
| A8 | −0.01634 | 0.001335 | −0.03717 | −0.00051 | −0.00052 | −0.00536 |
| A10 | −0.01074 | 0.003035 | 0.004367 | −0.01556 | −0.00059 | 0.000858 |
| A12 | 0.009733 | 0.00165 | 0.002141 | 0.005274 | −1.1E−05 | −0.0001 |
| A14 | −0.00341 | −0.0015 | 0.00066 | −0.00062 | 1.54E−05 | 8.15E−06 |
| A16 | 0 | 0 | 0 | 0 | 0 | 0 |

In the example 1, SA4=22.7°, SA6+X=64.4°, SA+Y=87.5°, (T2*T3)/(T4*A2)=0.949, (R1*vd1)/(R10*vd5)=−1.120, (f1*f5)/(f2*f6)=0.570, and {[(D6+0.7)/T6]−15}/100=0.012.

Figure 2:
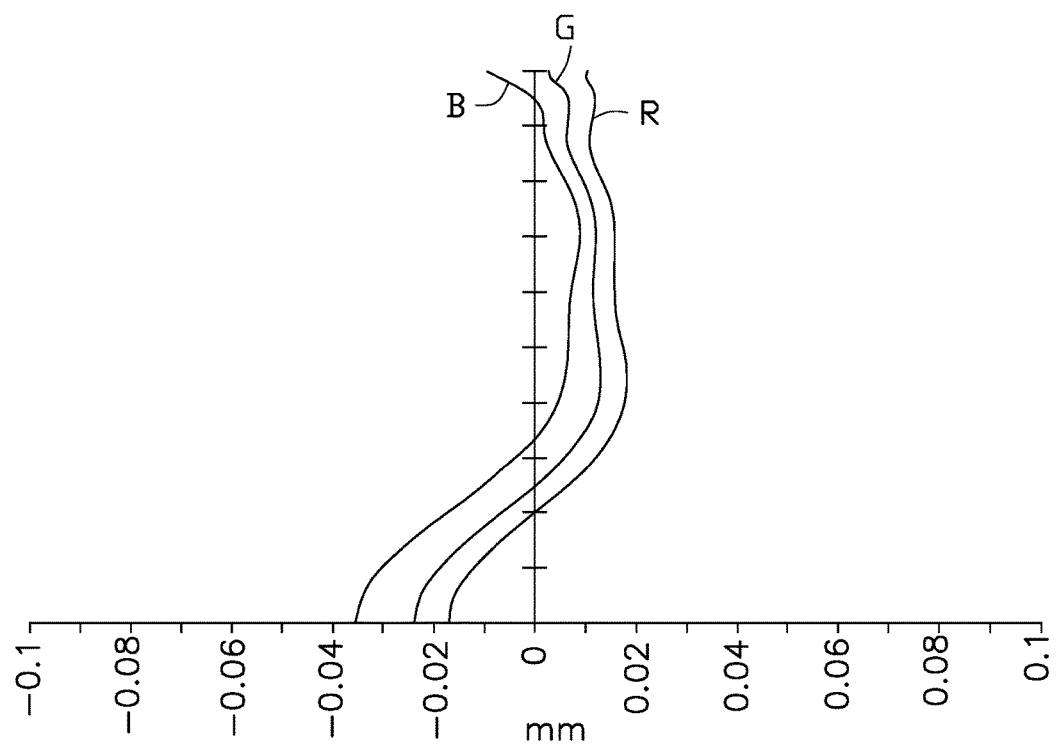
FIG. 2 is a longitudinal aberration diagram of the optical lens of FIG. 1, in wavelengths of 486.1 nm, 588.6 nm and 656.3 nm.

A longitudinal spherical aberration diagram of the optical lens 100 of the example 1 in wavelengths of 486.1 nm, 588.6 nm and 656.3 nm is shown in FIG. 2. The longitudinal spherical aberration is kept within a range of −0.04 mm to 0.02 mm.

Figure 3:
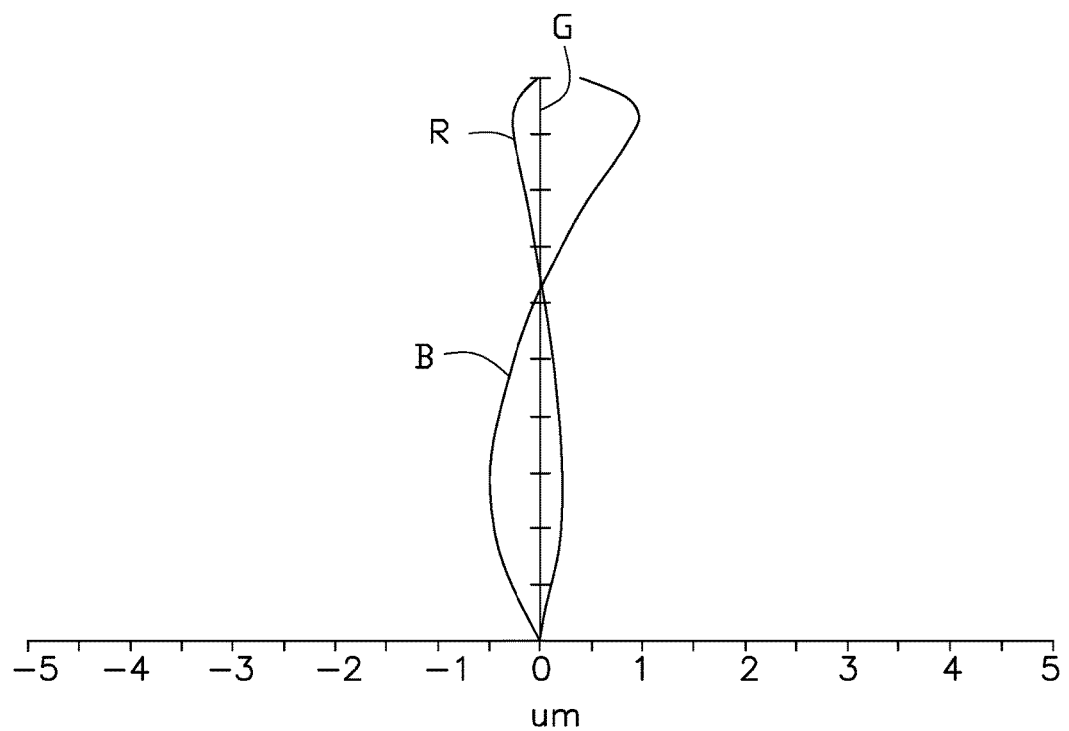
FIG. 3 is a lateral color aberration diagram of the optical lens of FIG. 1, in wavelengths of 486.1 nm, 588.6 nm and 656.3 nm.

A lateral color aberration diagram of the optical lens 100 of the example 1 in wavelengths of 486.1 nm, 588.6 nm and 656.3 nm is shown in FIG. 3. The ateral color aberration is kept within a range of −0.5 μm to 1 μm.

Figure 4:
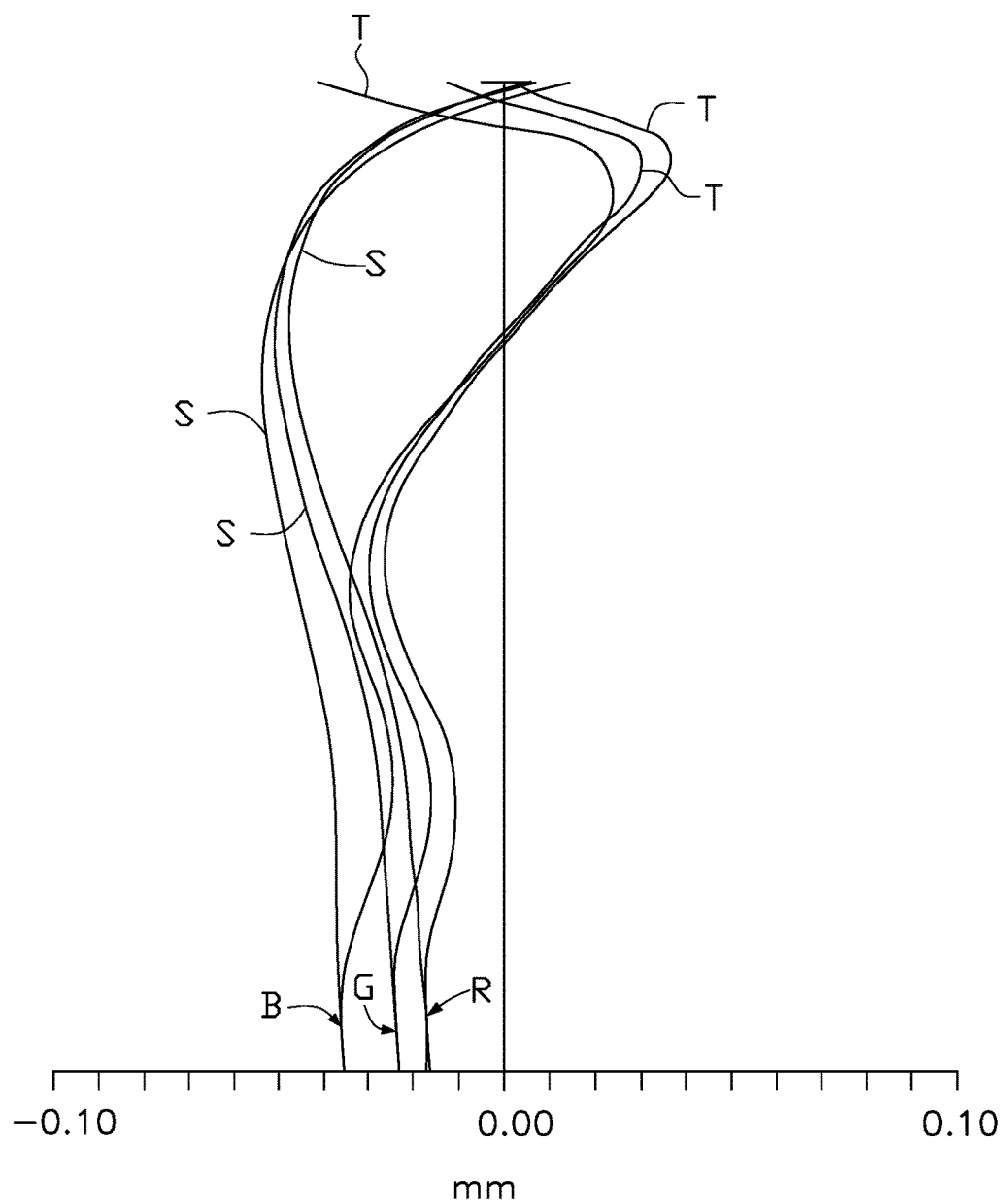
FIG. 4 is a field curvature diagram of the optical lens of FIG. 1, in wavelengths of 486.1 nm, 588.6 nm and 656.3 nm.

A field curvature diagram of the optical lens 100 of the example 1 in wavelengths of 486.1 nm, 588.6 nm and 656.3 nm is shown in FIG. 4. The field curvature is kept within a range of −0.06 mm to 0.04 mm.

Figure 5:
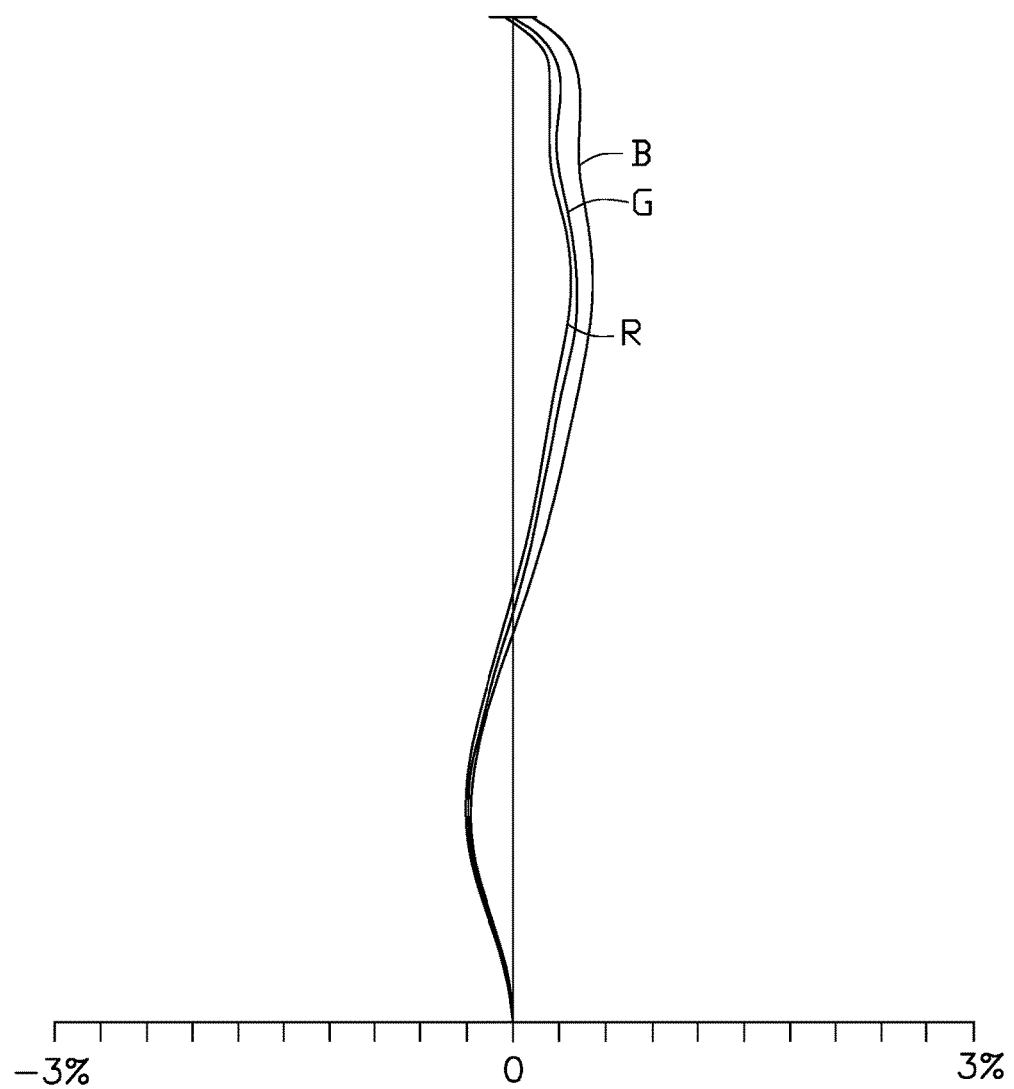
FIG. 5 is a distortion diagram of the optical lens of FIG. 1, in wavelengths of 486.1 nm, 588.6 nm and 656.3 nm.
Figure 6:
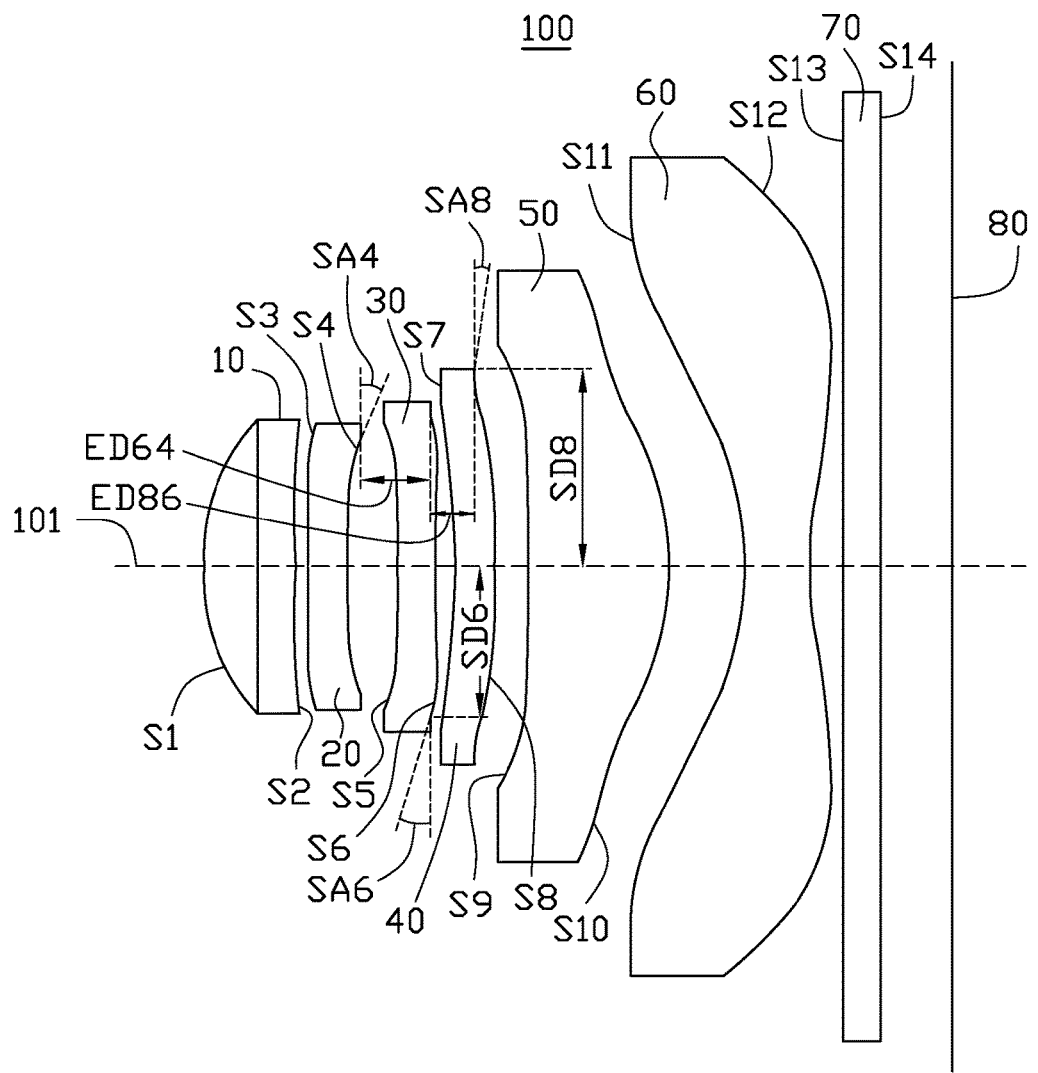
FIG. 6 is a diagram of a second exemplary embodiment of an optical lens.

A distortion diagram of the optical lens 100 of the example 1 in wavelengths of 486.1 nm, 588.6 nm and 656.3 nm is shown in FIG. 5. The distortion is kept within a range of −0.3% to 0.6%.

EXAMPLE 2

Tables 3-4 list the parameters of the optical lens 100a of the example 2.

TABLE 3

EFL = 3.4 mm, F/NO = 2, DFOV = 80.4°

| element | surface | Surface. Type | c | L | N | vd | h or SD | k | ED |
|---|---|---|---|---|---|---|---|---|---|
| first lens | S1 | asphere | 1.32 | 0.53 | 1.545 | 56 | 0.86 | 0.09 | 0.24 |
|  | S2 | asphere | 13.65 | 0.07 | — | — | 0.82 | 0.00 | 0.08 |
| second lens | S3 | asphere | −13.58 | 0.20 | 1.661 | 20.4 | 0.82 | 0.00 | 0.26 |
|  | S4 | asphere | 5.83 | 0.28 | — | — | 0.76 | 45.47 | 0.13 |

TABLE 3-continued

EFL = 3.4 mm, F/NO = 2, DFOV = 80.4°

| element | surface | Surface. Type | c | L | N | vd | h or SD | k | ED |
|---|---|---|---|---|---|---|---|---|---|
| third lens | S5 | asphere | 4.23 | 0.22 | 1.661 | 20.4 | 0.83 | 1.64 | 0.26 |
|  | S6 | asphere | 4.14 | 0.11 | — | — | 0.96 | −5.23 | 0.06 |
| fourth lens | S7 | asphere | −6.56 | 0.22 | 1.545 | 56 | 1.04 | −2.39 | 0.18 |
|  | S8 | asphere | −10.41 | 0.19 | — | — | 1.16 | 0.00 | 0.13 |
| fifth lens | S9 | asphere | −234.74 | 0.80 | 1.545 | 56 | 1.30 | 0.00 | 0.46 |
|  | S10 | asphere | −1.29 | 0.41 | — | — | 1.72 | −4.80 | 0.30 |
| sixth lens | S11 | asphere | −2.04 | 0.37 | 1.545 | 56 | 2.06 | −0.23 | 0.52 |
|  | S12 | asphere | 2.08 | 0.18 | — | — | 2.38 | −19.14 | 0.65 |
| optical filter | S13 |  | infinity | 0.21 | 1.523 | 54.5 | 2.70 | — | 0.21 |
|  | S14 |  | infinity | 0.40 | — | — | 2.76 | — | 0.40 |
| image plane |  |  | infinity | — | — | — | 2.95 | — | 0.00 |

TABLE 2

|  | S1 | S2 | S3 | S4 | S5 | S6 |
|---|---|---|---|---|---|---|
| $A_2$ | 0 | 0 | 0 | 0 | 0 | 0 |
| A4 | −0.02102 | −0.033945153 | −0.00121 | −0.01054 | −0.27757 | −0.17935 |
| A6 | 0.09622 | −0.000599343 | 0.262998 | 0.265076 | −0.01979 | −0.0421 |
| A8 | −0.22451 | 0.312540492 | −0.12032 | −0.31508 | −0.04846 | −0.03745 |
| A10 | 0.120779 | −0.476761624 | −0.00655 | 0.254273 | −0.15031 | 0.194855 |
| A12 | 0.193062 | −0.048888269 | −0.31993 | −0.17396 | 0.352179 | −0.22704 |
| A14 | −0.25755 | 0.190732037 | 0.378305 | 0.12359 | −0.16726 | 0.16288 |
| A16 | 0 | 0 | 0 | 0 | 0 | 0 |

|  | S7 | S8 | S9 | S10 | S11 | S12 |
|---|---|---|---|---|---|---|
| $A_2$ | 0 | 0 | 0 | 0 | 0 | 0 |
| A4 | −0.06009 | −0.10909 | −0.05774 | −0.06564 | −0.02219 | −0.05369 |
| A6 | 0.050663 | 0.056589 | 0.040817 | 0.067286 | 0.02624 | 0.018089 |
| A8 | −0.00269 | 0.000821 | −0.03808 | −0.00125 | −0.00175 | −0.00533 |
| A10 | 0.001472 | 0.000859 | 0.004602 | −0.01462 | −0.00032 | 0.000876 |
| A12 | 0.017551 | 0.000903 | 0.001943 | 0.005303 | −5.2E−06 | −0.0001 |
| A14 | −0.01049 | −0.00177 | −0.00014 | −0.00062 | 9.3E−06 | 6.97E−06 |
| A16 | 0 | 0 | 0 | 0 | 0 | 0 |

In the example 2, SA4=24.6°, SA6+X=67.5°, SA8+Y=88.0°, (T2*T3)/(T4*A2)=0.689, (R1*vd1)/(R10*vd5)=−1.025, (f1*f5)/(f2*f6)=−0.001, and {[(D6+0.7)/T6]−15}/100=0.565.

Figure 7:
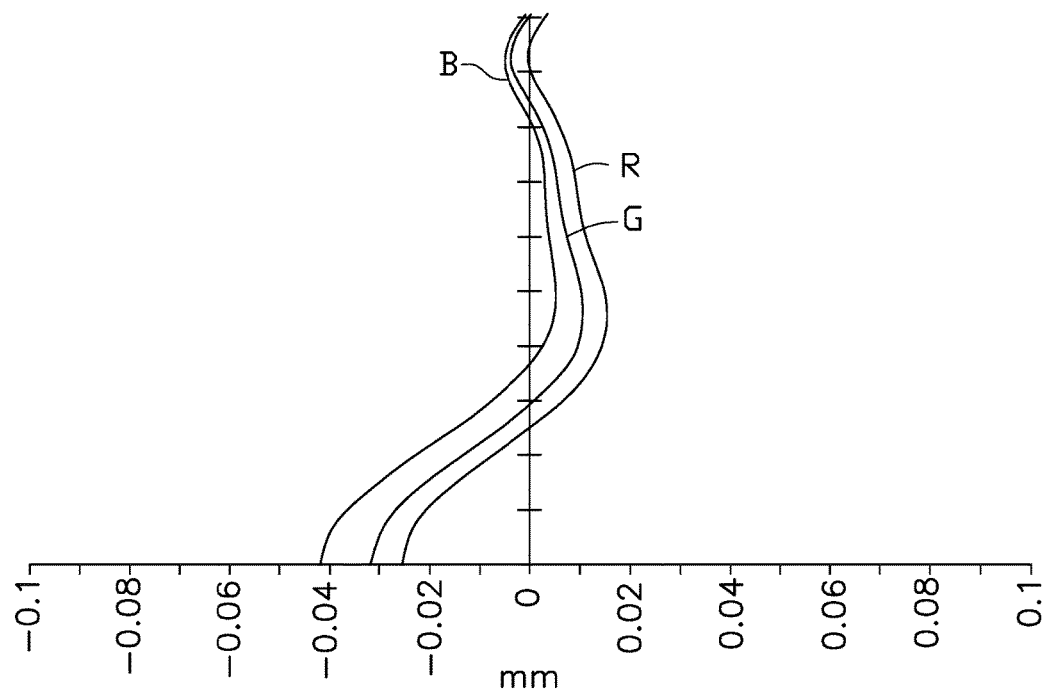
FIG. 7 is a longitudinal aberration diagram of the optical lens of FIG. 6, in wavelengths of 486.1 nm, 588.6 nm and 656.3 nm.

A longitudinal spherical aberration diagram of the optical lens 100a of the example 2 in wavelengths of 486.1 nm, 588.6 nm and 656.3 nm is shown in FIG. 7. The longitudinal spherical aberration is kept within a range of −0.045 mm to 0.02 mm.

Figure 8:
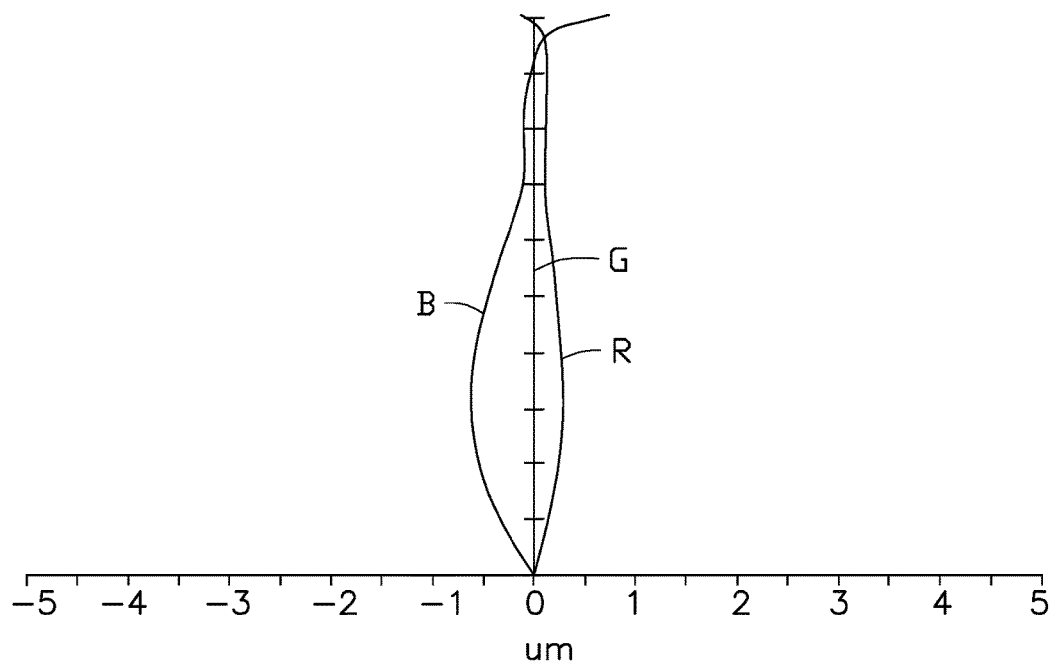
FIG. 8 is a lateral color aberration diagram of the optical lens of FIG. 6, in wavelengths of 486.1 nm, 588.6 nm and 656.3 nm.

A lateral color aberration diagram of the optical lens 100a of the example 2 in wavelengths of 486.1 nm, 588.6 nm and 656.3 nm is shown in FIG. 8. The ateral color aberration is kept within a range of −0.75 μm to 1 μm.

Figure 9:
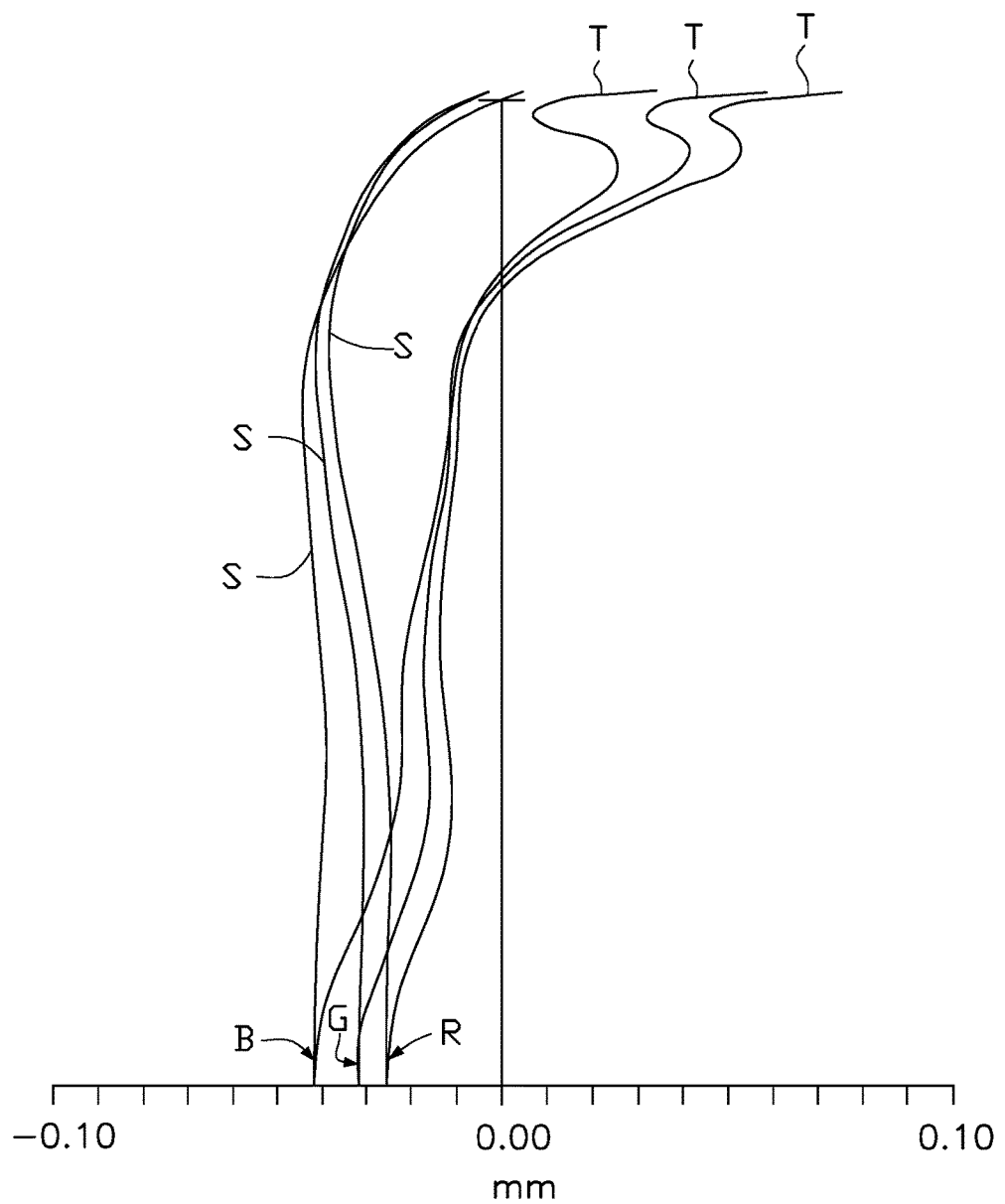
FIG. 9 is a field curvature diagram of the optical lens of FIG. 6, in wavelengths of 486.1 nm, 588.6 nm and 656.3 nm.

A field curvature diagram of the optical lens 100a of the example 2 in wavelengths of 486.1 nm, 588.6 nm and 656.3 nm is shown in FIG. 9. The field curvature is kept within a range of −0.05 mm to 0.08 mm.

Figure 10:
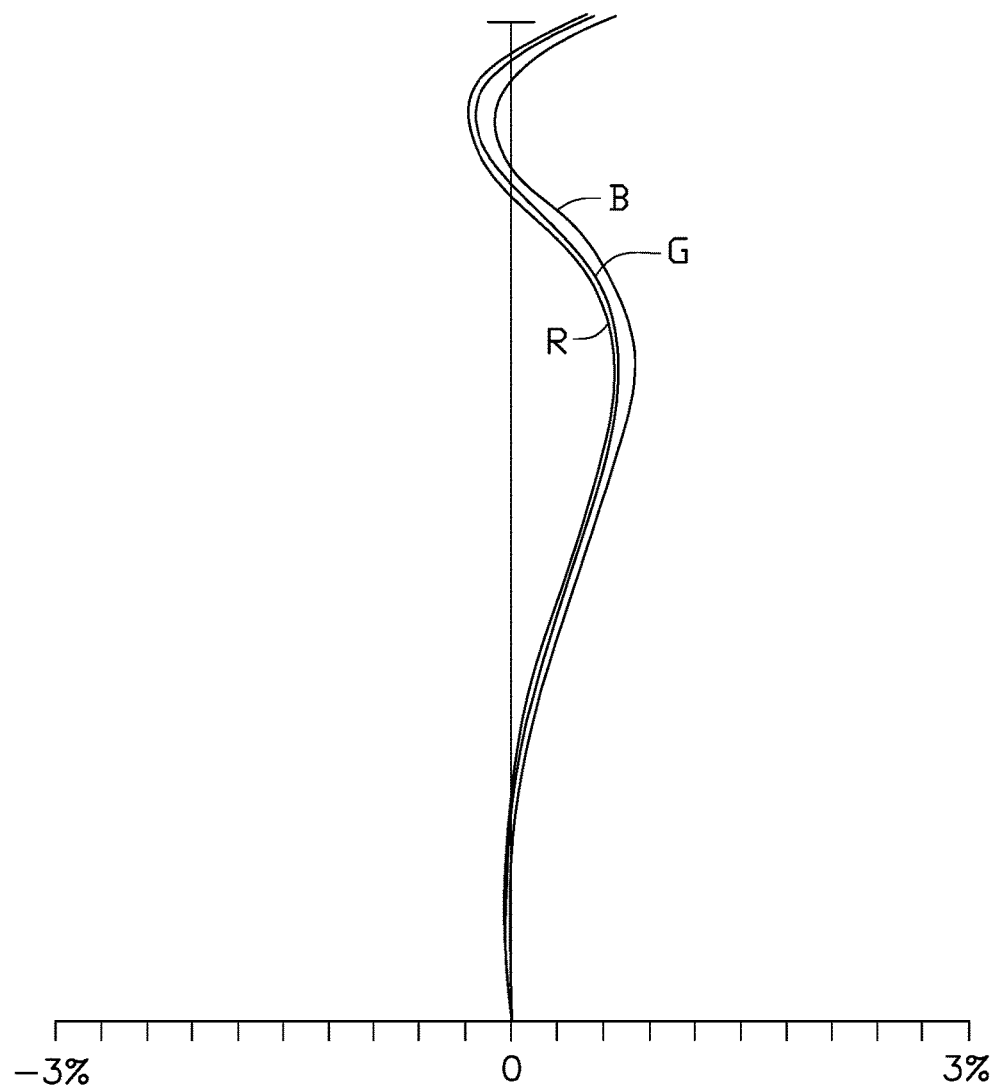
FIG. 10 is a distortion diagram of the optical lens of FIG. 6, in wavelengths of 486.1 nm, 588.6 nm and 656.3 nm.

A distortion diagram of the optical lens 100a of the example 2 in wavelengths of 486.1 nm, 588.6 nm and 656.3 nm is shown in FIG. 10. The distortion is kept within a range of 0.3% to 0.9%.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. An optical lens having an optical axis, the optical lens comprising:
   a first lens having a positive refractive power, and comprising a first surface and a second surface facing away from the first surface;
   a second lens having a positive refractive power or a negative refractive power, and comprising a third surface and a fourth surface facing away from the third surface;
   a third lens having a positive refractive power, and comprising a fifth surface and a sixth surface facing away from the fifth surface;
   a fourth lens having a negative refractive power, and comprising a seventh surface and an eighth surface facing away from the seventh surface;
   a fifth lens having a positive refractive power, and comprising a ninth surface and a tenth surface facing away from the ninth surface;
   a sixth lens having a negative refractive power, and comprising an eleventh surface and a twelfth surface facing away from the eleventh surface; and
   an image plane;
   wherein the first lens, the second lens, the third lens, the fourth lens, the fifth lens, the sixth lens, and the image plane are arranged in that sequence from object-side to image-side along the optical axis; the first surface, the second surface, the third surface, the fourth surface, the fifth surface, the sixth surface, the seventh surface, the eighth surface, the ninth surface, the tenth surface, the eleventh surface, and twelfth surface are arranged in that sequence from object-side to image-side; the optical lens satisfies the following conditions:

$21.3° < SA4 < 24.7°$;

$59° < SA6+X < 68°$, and $X = \arctan(SD6/ED64)$;

$81° < SA8+Y < 89°$, and $Y = \arctan(SD8/ED86)$;

$0.67 < (T2*T3)/(T4*A2) < 0.96$;

wherein SA4 denotes an angle between a tangent at an end portion of the fourth surface and the image plane, SA6 denotes an angle between a tangent at an end portion of the sixth surface and the image plane, SA8 denotes an angle between a tangent at an end portion of the eighth surface and the image plane, SD6 denotes a distance of the sixth surface from the end portion of the sixth surface to the optical axis, ED64 denotes a distance from the end portion of the sixth surface to the end portion of the fourth surface along an extending direction of the optical axis, SD8 denotes a distance of the eighth surface from the end portion of the eighth surface to the optical axis, and ED86 denotes a distance from the end portion of the eighth surface to the end portion of the sixth surface along the extending direction, T2 denotes a center thickness of the second lens, T3 denotes a center thickness of the third lens, T4 denotes a center thickness of the fourth lens, and A2 denotes a distance from the second lens to the third lens along the optical axis.

2. The optical lens of claim 1, wherein the fifth surface is a concave surface facing the object-side, the sixth surface is a convex surface facing the image-side, the seventh surface is a concave surface facing the object-side, and the eighth surface is a convex surface facing the image-side.

3. The optical lens of claim 1, wherein the tenth surface and the first surface are concaved toward opposite directions, or convexed toward opposite directions.

4. The optical lens of claim 3, wherein the first surface is a convex surface facing the object-side, the ninth surface is a concave surface facing the object-side, and the tenth surface is a convex surface facing the image-side.

5. The optical lens of claim 1, wherein the fourth surface is a concave surface facing the image-side.

6. The optical lens of claim 1, wherein the eleventh surface is a concave surface facing the object-side, and the twelfth surface is a convex surface facing the image-side.

7. The optical lens of claim 1, wherein the optical lens further satisfies the following condition:

$-1.19 < (R1*vd1)/(R10*vd5) < -1.01$;

wherein R1 denotes a radius of curvature of the first surface, vd1 denotes an Abbe number of the first lens, R10 denotes a radius of curvature of the tenth surface, and vd5 denotes an Abbe number of the fifth lens.

8. The optical lens of claim 1, wherein the optical lens further satisfies the following condition:

$-0.021 < \{[D6+0.7)/T6]-15\}/100 < 0.043$;

wherein D6 denotes a clear aperture diameter of the sixth lens, and T6 denotes a center thickness of the sixth lens.

9. The optical lens of claim 1, wherein when the second lens has a positive refractive power, the optical lens further satisfies the following condition:

$0.043 < (f1*f5)/(f2*f6) < 0.92$;

wherein f1 denotes an effective focal length of the first lens, f5 denotes an effective focal length of the fifth lens, f2 denotes an effective focal length of the second lens, and f6 denotes an effective focal length of the sixth lens.

10. The optical lens of claim 1, further comprising an optical filter between the sixth lens and the image plane.

* * * * *